United States Patent
Agirman (10) Patent No.: US 10,218,262 B1
(45) Date of Patent: Feb. 26, 2019

(54) HYBRID DIRECT CURRENT LINK SYSTEM FOR A REGENERATIVE DRIVE

(71) Applicant: Otis Elevator Company, Farmington, CT (US)

(72) Inventor: Ismail Agirman, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/713,829

(22) Filed: Sep. 25, 2017

(51) Int. Cl.
| | |
|---|---|
| *H02M 5/40* | (2006.01) |
| *H02M 1/42* | (2007.01) |
| *H02P 27/08* | (2006.01) |
| *B66B 1/30* | (2006.01) |
| *H02P 5/46* | (2006.01) |
| *H02M 7/68* | (2006.01) |
| *H02M 7/12* | (2006.01) |

(52) U.S. Cl.
CPC ............ *H02M 1/4216* (2013.01); *B66B 1/30* (2013.01); *H02M 5/40* (2013.01); *H02M 7/12* (2013.01); *H02M 7/68* (2013.01); *H02P 5/46* (2013.01); *H02P 27/085* (2013.01)

(58) Field of Classification Search
None
See application file for complete search history.

(56) References Cited

U.S. PATENT DOCUMENTS

| | | | |
|---|---|---|---|
| 5,552,976 A | 9/1996 | Munro et al. | |
| 5,825,639 A * | 10/1998 | Wagoner | H02J 1/02 363/39 |
| 5,936,855 A | 8/1999 | Salmon | |
| 7,061,212 B2 | 6/2006 | Phadke | |
| 7,154,759 B2 | 12/2006 | Kwon | |
| 8,102,165 B2 | 1/2012 | Gu et al. | |
| 8,582,268 B2 * | 11/2013 | Yamamoto | H01M 10/44 361/93.9 |

(Continued)

FOREIGN PATENT DOCUMENTS

| | | |
|---|---|---|
| CN | 104851594 | 8/2015 |
| FR | 2295547 | 7/1976 |

(Continued)

OTHER PUBLICATIONS

Wang et al. "Reliability of Capacitors for DC-Link Applications in Power Electronic Converters—An Overview", Sep. 2013, pp. 1-11.*

(Continued)

*Primary Examiner* — Jeffrey A Gblende
(74) *Attorney, Agent, or Firm* — Cantor Colburn LLP (57) ABSTRACT

A system includes a converter operatively connected to an alternating current (AC) power source and a direct current (DC) bus, an inverter operatively connected to a motor and the DC bus, and a hybrid DC link system operatively connected between a high side and a low side of the DC bus. The converter includes a first plurality of switching devices in selective communication with each phase of the AC power source and the DC bus. The inverter includes a second plurality of switching devices in selective communication with each phase of the motor and the DC bus. The hybrid DC link system includes a ripple current control branch in parallel with an energy buffering branch.

14 Claims, 5 Drawing Sheets

(56) References Cited

U.S. PATENT DOCUMENTS

| | | | |
|---|---|---|---|
| 8,736,215 B2 * | 5/2014 | Niwa | H02P 31/00 |
| | | | 318/400.3 |
| 8,779,709 B2 | 7/2014 | Lucas et al. | |
| 9,099,934 B2 | 8/2015 | Swamy | |
| 9,099,935 B2 | 8/2015 | Swamy | |
| 9,438,135 B2 * | 9/2016 | Kinoshita | H02M 1/14 |
| 9,762,145 B2 * | 9/2017 | Perreault | H02M 7/537 |
| 2014/0347896 A1 * | 11/2014 | Chung | H02M 1/143 |
| | | | 363/34 |
| 2015/0177287 A1 | 6/2015 | Babaraj | |
| 2015/0311695 A1 | 10/2015 | West et al. | |
| 2016/0327998 A1 | 11/2016 | Webster et al. | |
| 2017/0029242 A1 | 2/2017 | Agirman et al. | |
| 2017/0144555 A1 | 5/2017 | Chun et al. | |

FOREIGN PATENT DOCUMENTS

| | | |
|---|---|---|
| JP | 06151255 | 5/1994 |
| JP | 06151258 | 5/1994 |
| JP | 08203783 | 8/1996 |
| KR | 20030032250 | 4/2003 |
| WO | 2015113304 | 8/2015 |

OTHER PUBLICATIONS

H. Wang, et al., "Reliability of Capacitors for DC-Link Applications in Power Electronic Converters—An Overview," IEEE Energy Conversion and Exposition, Denver, CO, Sep. 15-19, 2013, 11 pages.

M.A. Brubaker, et al., "Increasing the Life of Electrolytic Capacitor Banks Using Integrated High Performance Film Capacitors," PCIM May 2013, 8 pages.

* cited by examiner

HYBRID DIRECT CURRENT LINK SYSTEM FOR A REGENERATIVE DRIVE

BACKGROUND

The subject matter disclosed herein relates generally to regenerative drive systems, and more particularly to a hybrid direct current link system for a regenerative drive.

Regenerative drives can be used to convert mechanical energy of a motor and a connected load to electrical energy, which is returned to an electrical power source under braking conditions. Regenerative drives can be used in conveyance systems, such as elevator systems, during braking of an elevator car. Regenerative drives can be subjected to energy variations depending on the application and events.

BRIEF SUMMARY

According to an exemplary embodiment, a system includes a converter operatively connected to an alternating current (AC) power source and a direct current (DC) bus. The converter includes a first plurality of switching devices in selective communication with each phase of the AC power source and the DC bus. The system also includes an inverter operatively connected to a motor and the DC bus. The inverter includes a second plurality of switching devices in selective communication with each phase of the motor and the DC bus. The system additionally includes a hybrid DC link system operatively connected between a high side and a low side of the DC bus. The hybrid DC link system includes a ripple current control branch in parallel with an energy buffering branch.

In addition to one or more of the features described above or below, or as an alternative, further embodiments may include where the ripple current control branch includes at least one film capacitor connected between the high side and the low side of the DC bus.

In addition to one or more of the features described above or below, or as an alternative, further embodiments may include where the energy buffering branch includes one or more electrolytic capacitors with an impedance element between the high side and the low side of the DC bus.

In addition to one or more of the features described above or below, or as an alternative, further embodiments may include a first resistor in parallel with a first electrolytic capacitor of the one or more electrolytic capacitors and a second resistor in series with the first resistor and parallel with a second electrolytic capacitor of the one or more electrolytic capacitors.

In addition to one or more of the features described above or below, or as an alternative, further embodiments may include a resistance of the first resistor is substantially equal to the resistance of the second resistor, and a capacitance of the first electrolytic capacitor is substantially equal to the capacitance of the second electrolytic capacitor.

In addition to one or more of the features described above or below, or as an alternative, further embodiments may include where the impedance element includes an inductor in series with a damping resistive element.

In addition to one or more of the features described above or below, or as an alternative, further embodiments may include where the damping resistive element is an external resistor.

In addition to one or more of the features described above or below, or as an alternative, further embodiments may include where the damping resistive element is a resistance integrated with the inductor.

In addition to one or more of the features described above or below, or as an alternative, further embodiments may include where the damping resistive element is a resistance integrated with at least one of the one or more electrolytic capacitors.

In addition to one or more of the features described above or below, or as an alternative, further embodiments may include a controller operable to transition the system to a fail-safe state based on one or more of: exceeding a maximum current rating in the hybrid DC link system and exceeding an imbalance limit in the hybrid DC link system.

According to an embodiment, a method includes operably connecting a converter to an AC power source and a DC bus. The converter includes a first plurality of switching devices in selective communication with each phase of the AC power source and the DC bus. An inverter is operably connected to a motor and the DC bus. The inverter includes a second plurality of switching devices in selective communication with each phase of the motor and the DC bus. A hybrid DC link system is operably connected between a high side and a low side of the DC bus. The hybrid DC link system comprising a ripple current control branch in parallel with an energy buffering branch. A ripple current is limited on the DC bus through the ripple current control branch of the hybrid DC link system. Variations in energy of the DC bus are buffered through the energy buffering branch of the hybrid DC link system.

Technical effects of embodiments of the present disclosure include providing a hybrid direct current link in a regenerative drive with ripple current control in parallel with energy buffering on a direct current bus of the regenerative drive.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed systems and method are presented herein by way of exemplification and not limitation with reference to the Figures. In general, embodiments herein relate to regenerative drives employing an active converter to supply a direct current (DC) bus that in turn supplies voltage to an inverter that generates motor excitation signals to drive a motor. Moreover, embodiments herein are directed to a hybrid DC link system to suppress ripple current and buffer energy spikes on the DC bus, particularly under transient conditions in a regenerative mode that returns energy from the motor back to a power supply. Embodiments herein set forth a drive and motor system for a converter to actively control a DC voltage that can be generated from an alternating current (AC) side sinusoidal current. The DC voltage is employed to generate AC excitation voltage using fast switching of power electronics devices to control a motor.

For conservative design considerations, a direct current link of a regenerative drive can be oversized for energy rating purposes due to emergency stop events or transient conditions. Electrical components, such as electrolytic direct current capacitors, used in a direct current link of a regenerative drive that provide high energy storage can have a shorter life and/or a low ripple current rating. In contrast, electrical components, such as film capacitors, used in a direct current link of a regenerative drive that have a longer life and/or a higher ripple current rating can have a larger physical size and a higher cost but small in energy density rating.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), a field programmable gate array (FPGA), an electronic circuit, an electronic processor (shared, dedicated, or group) and memory that executes one or more software or firmware programs stored in a non-transitory form, a combinational logic circuit, and/or other suitable interfaces and components that provide the described functionality.

Figure 1:
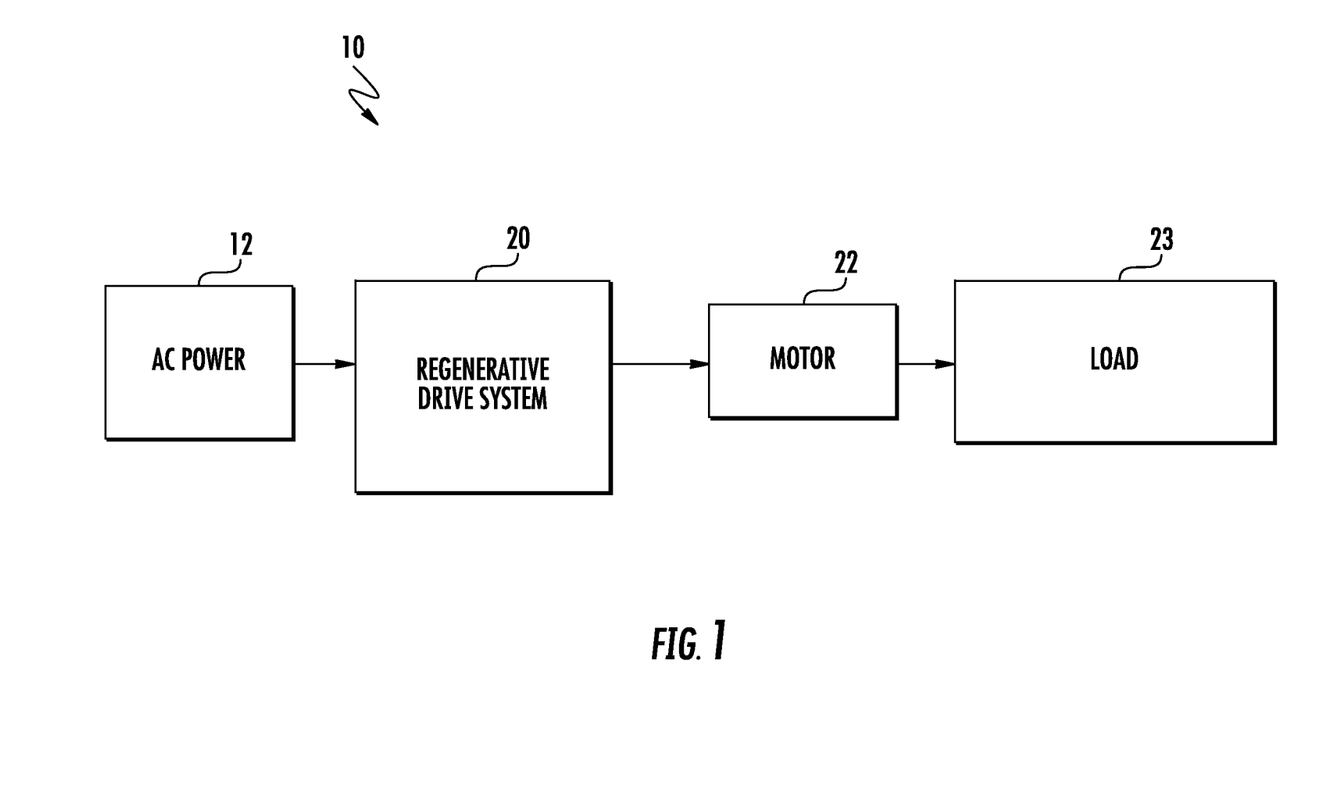
FIG. 1 is a block diagram of components of a power system in accordance with an embodiment.

FIG. 1 is a block diagram of components of a power system 10 of an embodiment as may be employed to power one or more loads 23. Power system 10 includes an AC power source 12, such as an electrical main line (e.g., 440 volt, 3-phase). The AC power source 12 provides AC power to a regenerative drive system 20. The regenerative drive system 20 is operable as a motor drive and a regenerative drive capable of harnessing regenerative energy from a motor 22 during braking of a load 23 being driven. In an embodiment, the power system 10 is described with respect to an elevator system 100 (FIG. 4); however, application to any system where a motor drive is employed may be envisioned. For example, in some embodiments, the load 23 can be an alternate conveyance system, such as an escalator, moving walkway, trolley, or the like. As a further example, the load 23 can be a component, such as a compressor, of a heating ventilation and air conditioning or refrigeration system (HVAC/R) system.

Figure 2:
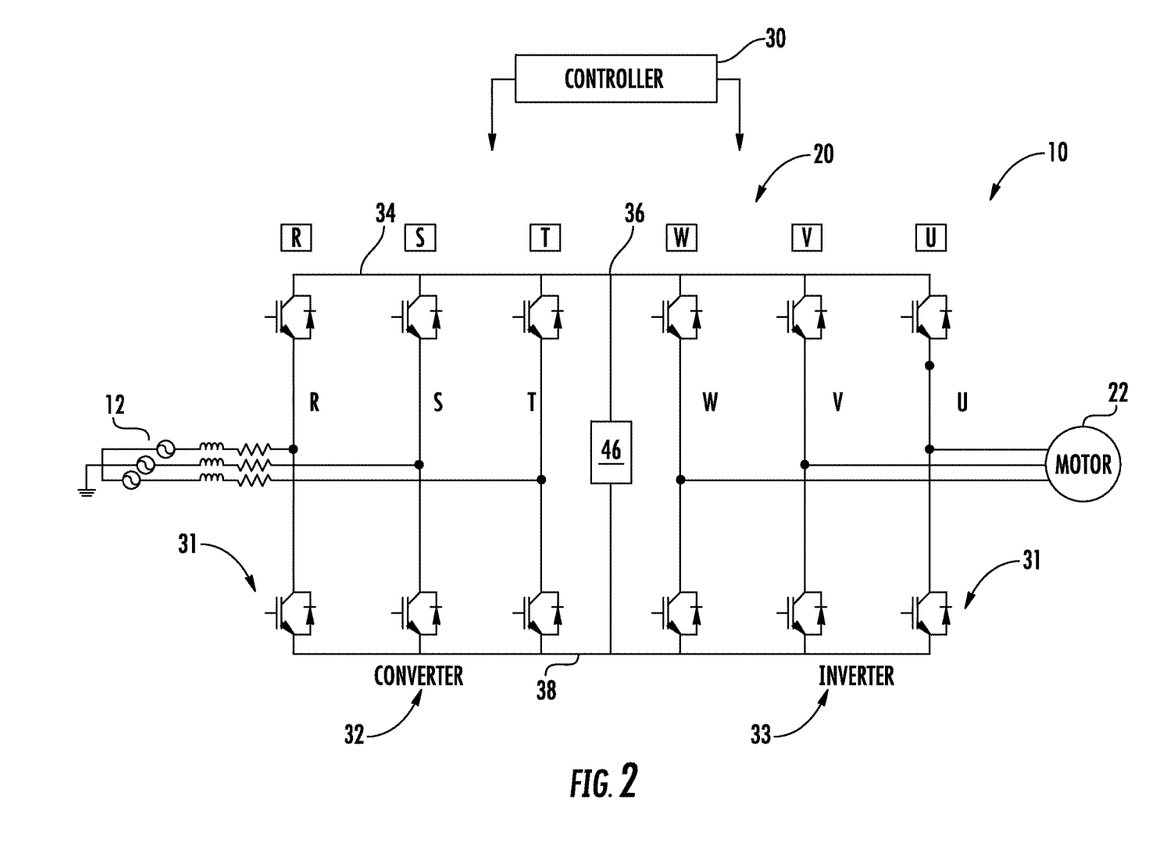
FIG. 2 is a simplified schematic of a regenerative drive system in accordance with an embodiment.

FIG. 2 is a simplified schematic of the power system 10 with the regenerative drive system 20 depicted in greater detail. The AC power source 12 in the power system 10 can be, for example, an electrical main line (e.g., 440 volt, 3-phase). In the example of FIG. 2, the regenerative drive system 20 is a regenerative drive that includes a converter 32 having 3 phase legs, R, S, and T. Each phase leg, R, S, and T, includes switching devices 31 controlled by control signals from a controller 30 to convert AC power to DC power on a DC bus 34 having a high side 36 and a low side 38. The regenerative drive system 20 also includes an inverter 33 having 3 phase legs, W, V, and U. Each phase leg, W, V, and U, includes switching devices 31 controlled by control signals from the controller 30 to convert DC power across the DC bus 34 to AC drive signals to power the motor 22. In embodiments, a hybrid DC link system 46 is operably connected between the high side 36 and the low side 38 of the DC bus 34 to limit a ripple current on the DC bus 34 and buffer variations in energy of the DC bus 34 as further described herein. The controller 30 may be implemented using a general-purpose microprocessor executing a computer program stored on a storage medium to perform the operations described herein. Alternatively, the controller 30 may be implemented in hardware (e.g., ASIC, FPGA) or in a combination of hardware/software.

Figure 3:
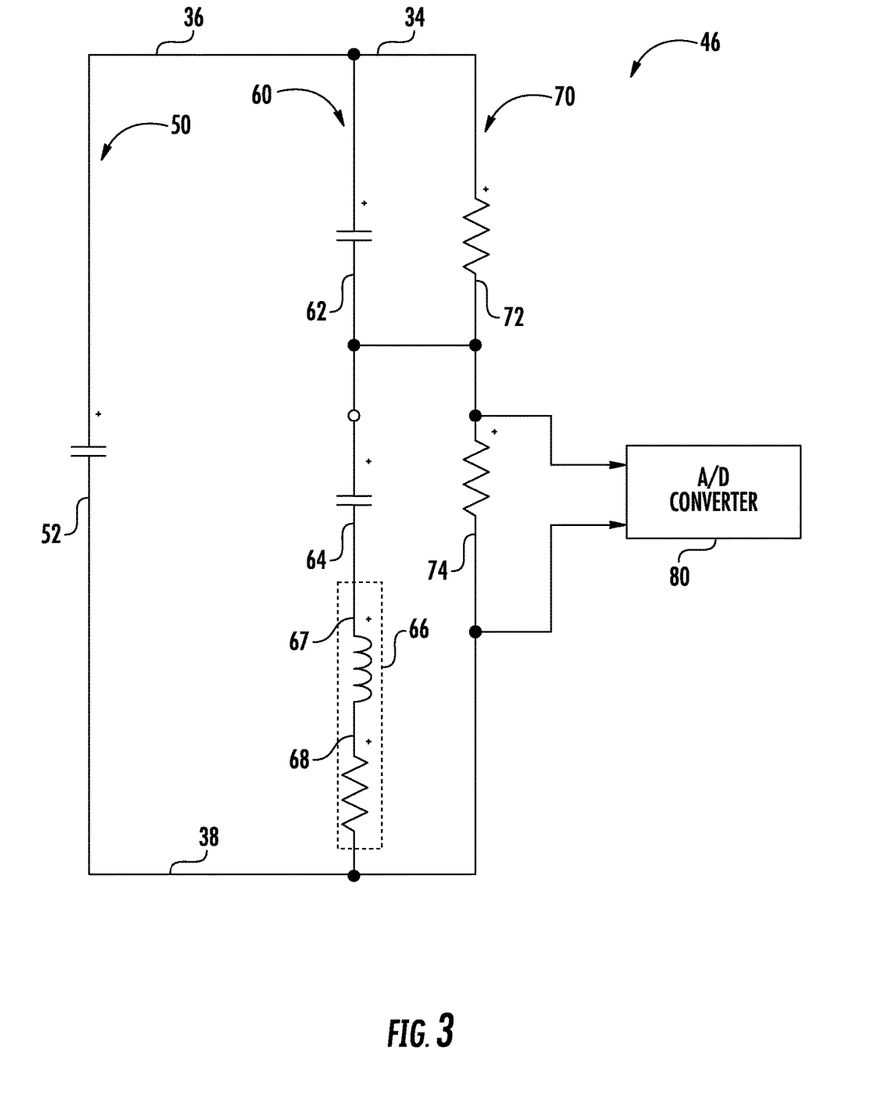
FIG. 3 is a simplified schematic of a hybrid direct current link system in accordance with an embodiment.

FIG. 3 depicts the hybrid DC link system 46 in greater detail in accordance with an exemplary embodiment. In the example of FIG. 3, the hybrid DC link system 46 includes a ripple current control branch 50 in parallel with an energy buffering branch 60 between the high side 36 and the low side 38 of the DC bus 34. The ripple current control branch 50 includes at least one film capacitor 52 connected between the high side 36 and the low side 38 of the DC bus 34. The energy buffering branch 60 includes one or more electrolytic capacitors with an impedance element 66 between the high side 36 and the low side 38 of the DC bus 34, where two electrolytic capacitors 62, 64 are depicted in series with the impedance element 66 in the example of FIG. 3.

The hybrid DC link system 46 can also include a first resistor 72 in parallel with a first electrolytic capacitor 62 and a second resistor 74 in series with the first resistor 72 and parallel with a second electrolytic capacitor 64, where the electrolytic capacitors 62, 64 have a sufficiently low voltage rating to be connected in series. If the energy buffering branch 60 has an equivalent voltage rating to the ripple current control branch 50, then the resistors 72, 74 can be omitted. A resistance of the first resistor 72 can be substantially equal to the resistance of the second resistor 74, and a capacitance of the first electrolytic capacitor 62 can be substantially equal to the capacitance of the second electrolytic capacitor 64. The electrolytic capacitors 62, 64 can provide higher energy storage than the film capacitor 52. The resistors 72, 74 can provide voltage balancing for electrolytic capacitors 62, 64 to equally share the DC voltage of the DC bus 34 between the high side 36 and the low side 38 under normal operating conditions. In contrast, the film capacitor 52 has a higher ripple current rating than the electrolytic capacitors 62, 64.

The impedance element 66 can be an inductor 67 in series with a damping resistive element 68. The damping resistive element 68 can be an external resistor, a resistance integrated with the inductor 67, a resistance integrated with at least one of the electrolytic capacitors 62, 64, or a combination thereof. For instance, in some embodiments, a trace resistance in a printed circuit board that includes the energy buffering branch 60 can be designed to meet resistance requirements of all or a portion of the damping resistive element 68. Similarly, the inductor 67 can be a circuit board mounted component and/or a trace inductance within a circuit board. Integration of the damping resistive element 68 in the inductor 67 can include designing/selecting the inductor 67 with the damping resistive element 68 as an intrinsic characteristic of the inductor 67.

In embodiments, main high frequency ripple currents are handled by the film capacitor 52 of the ripple current control branch 50. Transient energy buffering, such as an emergency braking condition of the motor 22, is handled by the electrolytic capacitors 62, 64 of the energy buffering branch 60 or in conjunction with film capacitor 52. The electrolytic capacitors 62, 64 compensate the remaining energy buffering requirements in case of an emergency stop and/or low frequency transients on the DC link between the high side 36 and the low side 38 of the DC bus 34. The impedance element 66 forces higher frequency currents to the film capacitor 52 of the ripple current control branch 50. The damping resistive element 68 can prevent over-voltage conditions (e.g., caused by transient resonance) in the energy buffering branch 60 and enable the electrolytic capacitors 62, 64 to perform transient energy buffering while damping resonances.

Various components of the hybrid DC link system 46 can be monitored for potential issues. As one example, an analog-to-digital (A/D) converter 80 can be connected across the second resistor 74 to enable the controller 30 (FIG. 2) or other monitoring circuitry to observe a voltage (e.g., a half DC link voltage). The A/D converter 80 can be connected to or integrated with the controller 30. The A/D converter 80 and other such monitors (not depicted) can be used for voltage/current monitoring to detect and contain DC link failures. For example, DC link voltage ripple and frequency can be determined by the controller 30 and further used to determine a current in the inductor 67. If the current in the inductor 67 exceeds a current rating of the inductor 67, the controller 30 can disconnect power from the AC power source 12 (FIGS. 1 and 2). The controller 30 and also monitor for an AC line imbalance above an imbalance limit (e.g., greater than 10%). If an imbalance limit in the hybrid DC link system 46 is exceeded, the controller 30 may disconnect power from the AC power source 12 as a fail-safe state and/or take other mitigating actions.

Figure 4:
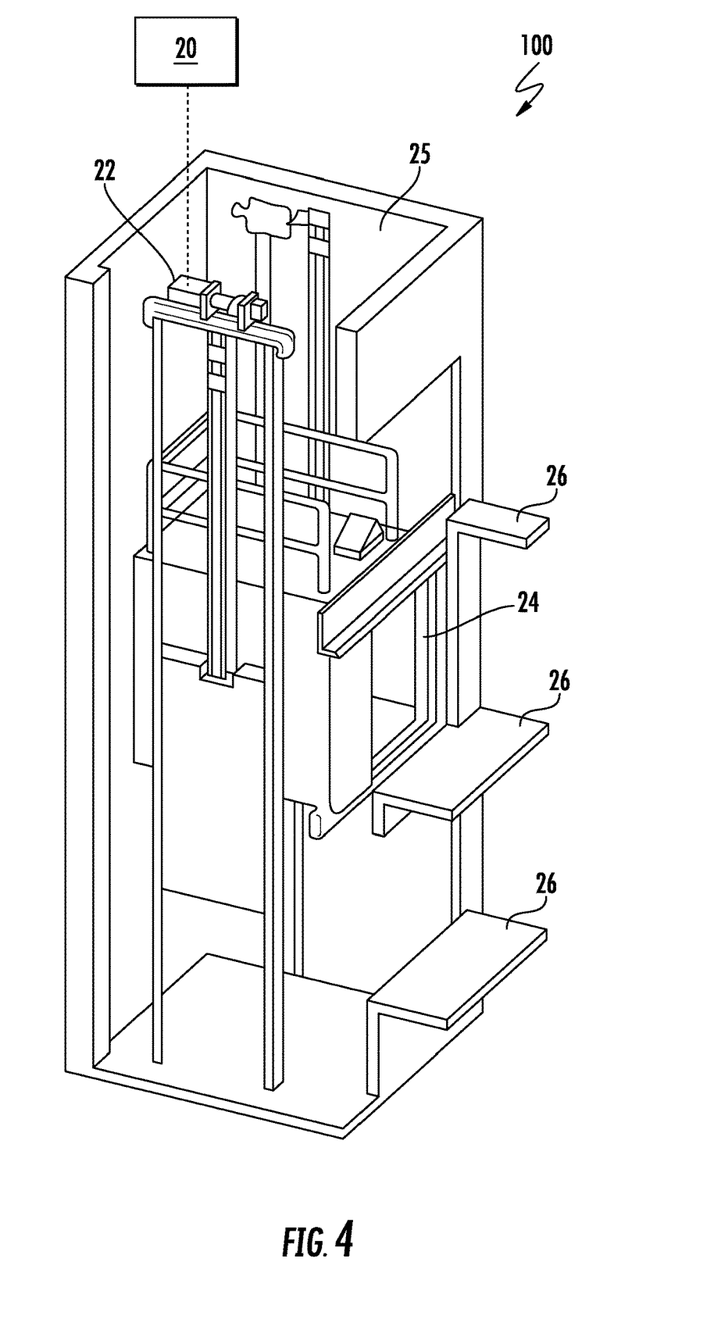
FIG. 4 is a simplified schematic of an elevator system in accordance with an embodiment.

FIG. 4 is a schematic diagram of an elevator system 100 according to an exemplary embodiment. It is to be understood that the version of the elevator system 100 shown in FIG. 4 is for illustrative purposes only and to assist in disclosing various embodiments. As is understood by a person skilled in the art, FIG. 4 does not depict all of the components of an exemplary elevator system, nor are the depicted features necessarily included in all elevator systems.

As shown in FIG. 4, the elevator system 100 may reside fully or partially in a hoistway 25 that is vertically disposed within a building. The hoistway 25 may provide a vertical path through which an elevator car 24 may travel between floors or landings 26 of the building. Motor 22, or other prime mover, may be operatively connected to the elevator car 24 in order to generate a thrust force to move the elevator car 24 within the hoistway 25. The motor 22 may also be referred to as a machine, or in alternate configurations, the motor 22 may be a part of a machine that is used to move an elevator car 24.

An AC power source 12 (as shown in FIGS. 1 and 2) may be operatively connected to the motor 22 in order to supply power to the motor 22. The AC power source 12 may be externally generated power, such as from a power utility grid. The motor 22 and AC power source 12 may each be three-phase. In addition, regenerative drive system 20 may be coupled to the motor 22 and AC power source 12 in order to operate the motor 22 to achieve the desired elevator car movement, where the elevator car 24 is an example of the load 23 of FIG. 1.

Figure 5:
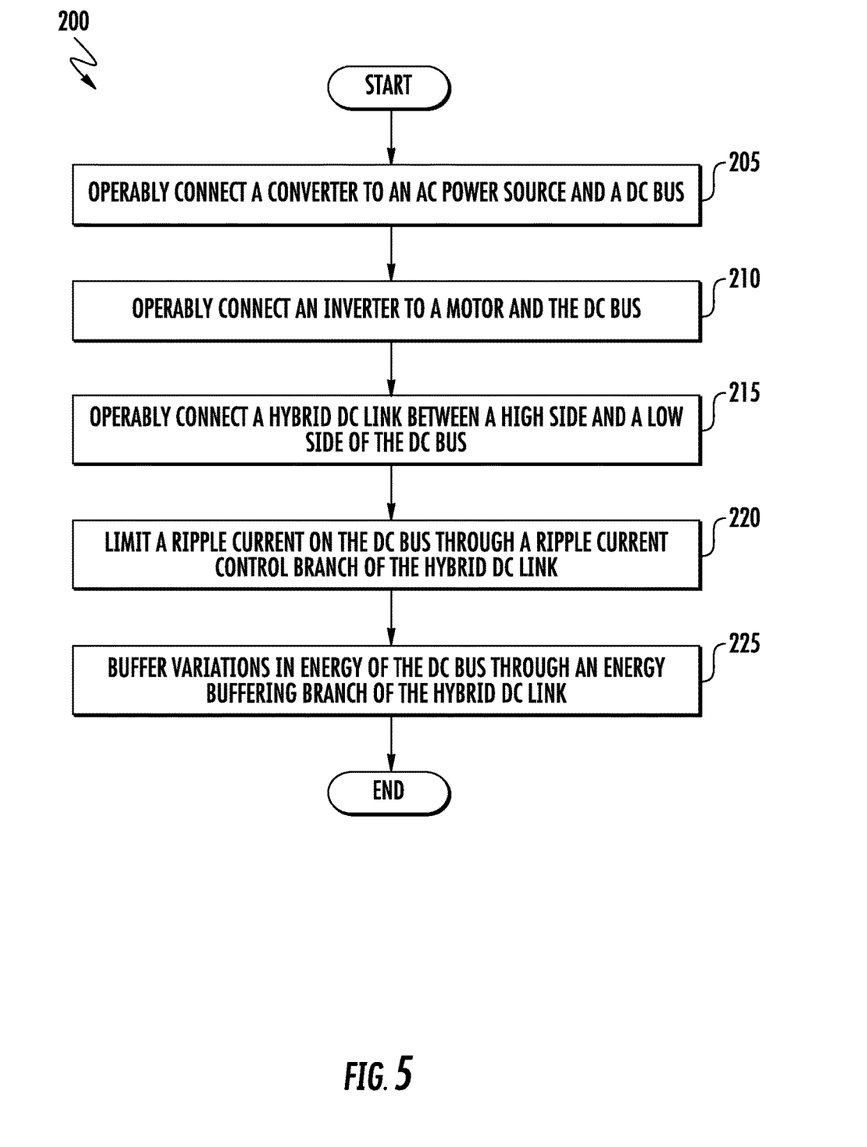
FIG. 5 depicts a flowchart of a method in accordance with an embodiment.

FIG. 5 depicts a flowchart of a method 200 in accordance with an embodiment. The method 200 is described in reference to FIGS. 1-5 and may include additional elements beyond those depicted and described in FIG. 5. The order of the method 200 is not limited by the sequence of FIG. 5, which provides an example for purposes of explanation.

At block 205, a converter 32 is operably connected to an AC power source 12 and a DC bus 34. The converter 32 includes a first plurality of switching devices 31 in selective communication with each phase R, S, T of the AC power source 12 and the DC bus 34.

At block 210, an inverter 33 is operatively connected to a motor 22 and the DC bus 34. The inverter 33 includes a second plurality of switching devices 31 in selective communication with each phase W, V, U of the motor 22 and the DC bus 34.

At block 215, a hybrid DC link system 46 is operably connected between a high side 36 and a low side 38 of the DC bus 34. The hybrid DC link system 46 includes a ripple current control branch 50 in parallel with an energy buffering branch 60. A first resistor 72 is operably connected in parallel with a first electrolytic capacitor 62 of the energy buffering branch 60. A second resistor 74 is operably connected in series with the first resistor 72 and parallel with a second electrolytic capacitor 64 of the energy buffering branch 60.

At block 220, a ripple current is limited on the DC bus 34 through the ripple current control branch 50 of the hybrid DC link system 46. At block 225, variations in energy of the DC bus 34 are buffered through the energy buffering branch 60 of the hybrid DC link system 46. The controller 30 can monitor for various out of range or failure conditions through the hybrid DC link system 46 and react accordingly. For example, voltage and/or current monitoring can be performed through the A/D converter 80 and other such circuits (not depicted). The controller 30 can transition the regenerative drive system 20 to a fail-safe state based on one or more of: detecting, by the controller 30, an exceedance of a maximum current rating in the hybrid DC link system 46 and detecting, by the controller 30, an exceedance of an imbalance limit in the hybrid DC link system 46. A fail-safe state can include disconnecting or otherwise interrupting an electrical connection with the AC power source 12. For example, the switching devices 31 of the converter 32 can be set to an open state that prevents an electrical current flow between the AC power source 12 and the DC bus 34. Alternatively, one or more switches or contactors between the converter 32 and the AC power source 12 can be opened.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system, comprising:
   a converter operatively connected to an alternating current (AC) power source and a direct current (DC) bus, the converter comprising a first plurality of switching devices in selective communication with each phase of the AC power source and the DC bus;
   an inverter operatively connected to a motor and the DC bus, the inverter comprising a second plurality of switching devices in selective communication with each phase of the motor and the DC bus; and
   a hybrid DC link system operatively connected between a high side and a low side of the DC bus, the hybrid DC link system comprising a ripple current control branch in parallel with an energy buffering branch, wherein:
   the ripple current control branch comprises at least one film capacitor connected between the high side and the low side of the DC bus; and
   the energy buffering branch comprises:
   one or more electrolytic capacitors with an impedance element between the high side and the low side of the DC bus; and
   a first resistor in parallel with a first electrolytic capacitor of the one or more electrolytic capacitors and a second resistor in series with the first resistor and parallel with a second electrolytic capacitor of the one or more electrolytic capacitors.

2. The system of claim 1, wherein a resistance of the first resistor is substantially equal to the resistance of the second resistor, and a capacitance of the first electrolytic capacitor is substantially equal to the capacitance of the second electrolytic capacitor.

3. The system of claim 1, wherein the impedance element comprises an inductor in series with a damping resistive element.

4. The system of claim 3, wherein the damping resistive element comprises an external resistor.

5. The system of claim 3, wherein the damping resistive element comprises a resistance integrated with the inductor.

6. The system of claim 3, wherein the damping resistive element comprises a resistance integrated with at least one of the one or more electrolytic capacitors.

7. The system of claim 1, further comprising a controller operable to transition the system to a fail-safe state based on one or more of: exceeding a maximum current rating in the hybrid DC link system and exceeding an imbalance limit in the hybrid DC link system.

8. A method comprising:
   operably connecting a converter to an alternating current (AC) power source and a direct current (DC) bus, the converter comprising a first plurality of switching devices in selective communication with each phase of the AC power source and the DC bus;
   operably connecting an inverter to a motor and the DC bus, the inverter comprising a second plurality of switching devices in selective communication with each phase of the motor and the DC bus;
   operably connecting a hybrid DC link system between a high side and a low side of the DC bus, the hybrid DC link system comprising a ripple current control branch in parallel with an energy buffering branch, wherein:
   the ripple current control branch comprises at least one film capacitor connected between the high side and the low side of the DC bus; and
   the energy buffering branch comprises:
   one or more electrolytic capacitors with an impedance element between the high side and the low side of the DC bus; and
   a first resistor in parallel with a first electrolytic capacitor of the one or more electrolytic capacitors and a second resistor in series with the first resistor and parallel with a second electrolytic capacitor of the one or more electrolytic capacitors;
   limiting a ripple current on the DC bus through the ripple current control branch of the hybrid DC link system; and
   buffering variations in energy of the DC bus through the energy buffering branch of the hybrid DC link system.

9. The method of claim 8, wherein a resistance of the first resistor is substantially equal to the resistance of the second resistor, and a capacitance of the first electrolytic capacitor is substantially equal to the capacitance of the second electrolytic capacitor.

10. The method of claim 8, wherein the impedance element comprises an inductor in series with a damping resistive element.

11. The method of claim 10, wherein the damping resistive element comprises an external resistor.

12. The method of claim 10, wherein the damping resistive element comprises a resistance integrated with the inductor.

13. The method of claim 10, wherein the damping resistive element comprises a resistance integrated with at least one of the one or more electrolytic capacitors.

14. The method of claim 8, further comprising:
transitioning, by a controller, a regenerative drive system comprising the converter and the inverter to a fail-safe state based on one or more of: detecting, by the controller, an exceedance of a maximum current rating in the hybrid DC link system and detecting, by the controller, an exceedance of an imbalance limit in the hybrid DC link system.

\* \* \* \* \*